Oct. 1, 1935.  J. E. PRICE ET AL  2,016,024
PICKER ROLL ADJUSTMENT
Filed May 28, 1934   2 Sheets-Sheet 2

John E. Price
Samuel J. Shehan  INVENTORS.
BY Loyal J. Miller
ATTORNEYS.

Patented Oct. 1, 1935

2,016,024

UNITED STATES PATENT OFFICE 2,016,024

PICKER-ROLL ADJUSTMENT

John E. Price and Samuel J. Shehan, Yukon, Okla.

Application May 28, 1934, Serial No. 727,943

4 Claims. (Cl. 19—55)

My invention relates to cotton ginning equipment and more particularly to mechanism for adjusting the picker-roll of a gin stand with relation to the gin saws.

In ginning cotton, the cotton including the lint, the seed and burs or other foreign materials are passed between a rotating cylinder made of spaced disc saws and a rotating picker-roll which consists of a cylinder having a multitude of protruding spikes. The cotton is usually hauled to the gin in wagons and each wagon load may vary in character considerably from the others. Consequently, in order to efficiently gin the different types of cotton having different amounts of foreign materials and different moisture content, it is desirable to mount the picker-roll in such a manner that it may be moved with relation to the saw cylinder.

So far as is known by these inventors, at the present time the only means of adjusting the picker-roll consists of a nut upon each end of its shaft. It is therefore necessary to loosen the nuts one at a time, move each end of the picker-roll shaft independently and reset the nuts. This operation requires so much time that before an adjustment has been accomplished the gin is operating on a different wagon load of cotton.

The prime object of the present invention is to provide a mechanism for adjusting the picker-roll instantaneously and in such a manner that both of its ends remain spaced a similar distance from the saw cylinder at all times.

Other objects of the invention are to provide a device of this class which is new, novel, practical and of utility; which will automatically tighten and loosen the driving chain when the picker-roll is moved; which also includes an independent chain tightening means that may be selectively adjusted; which permits adjustment of the picker-roll in various positions within a large range of space, and will positively hold the roll at the desired position; which may be so quickly operated that a battery of several gin stands may all be adjusted identically by a single operator in one or two minutes; which may be built upon a gin stand as factory equipment or may be attached to used gin stands without altering materially the usual equipment; which will be cheap to manufacture and install; which will be durable; and, which will be efficient in accomplishing all the purposes for which it is intended.

With these and other objects in view as will more fully appear hereinbelow, my invention consists in the construction, novel features, and combination of parts hereinafter more fully described, pointed out in the claims hereto appended, and illustrated in the accompanying two-sheet drawings, of which, Figure 1 is a fragmentary front elevational view of a gin stand showing the device installed;

Like characters of reference designate like parts in all the figures.

Figure 1:
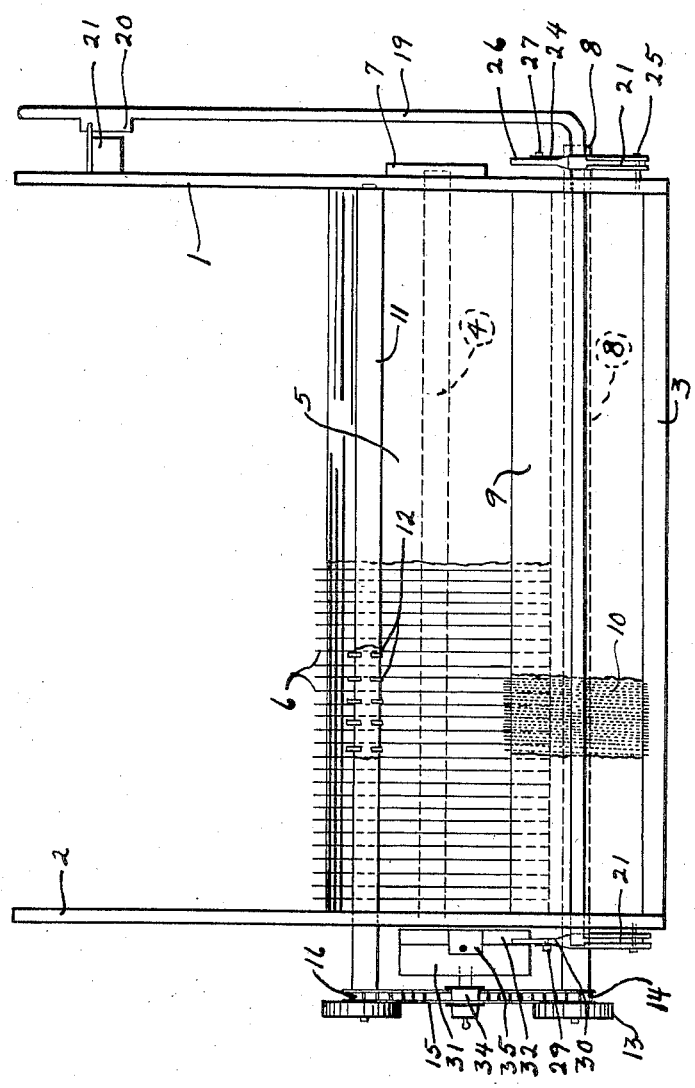
Figure 2:
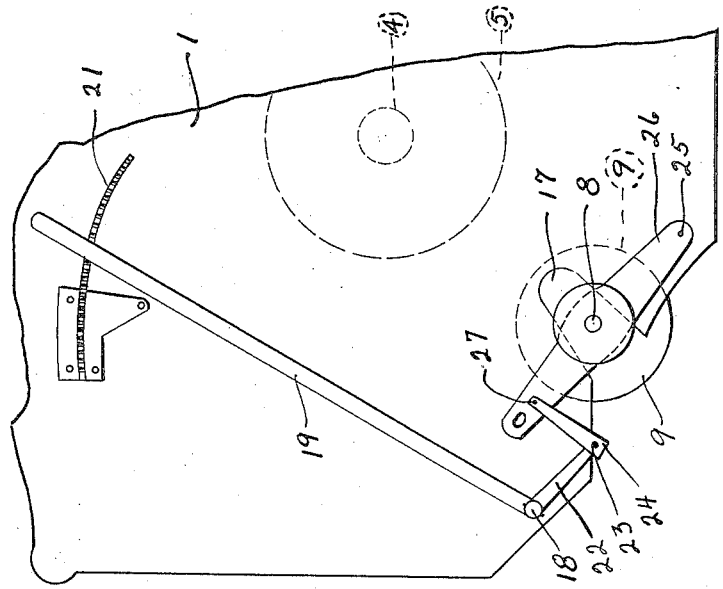
Fig. 2 is a fragmentary view of the right hand end of the gin stand, looking from the front, and showing the device installed.
Figure 3:
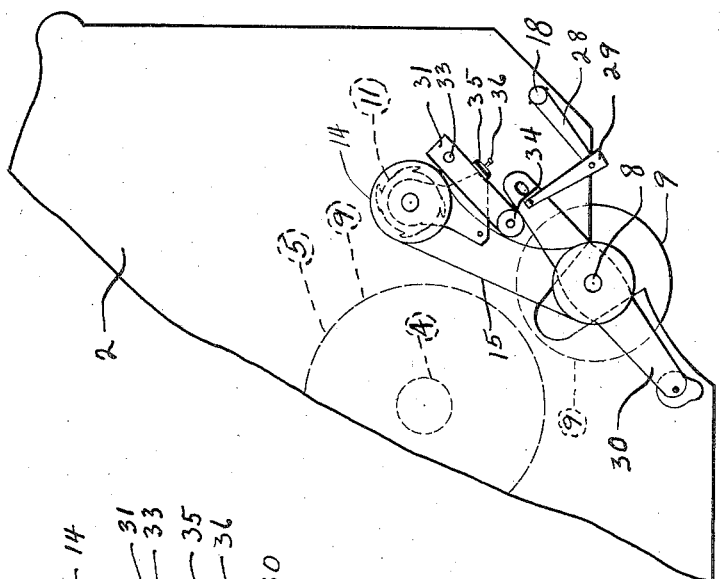
Fig. 3 is a view similar to Fig. 2, but showing the left hand end of the gin stand; and, Fig. 4 is a detail of the automatic belt or chain tightening mechanism.
Figure 4:
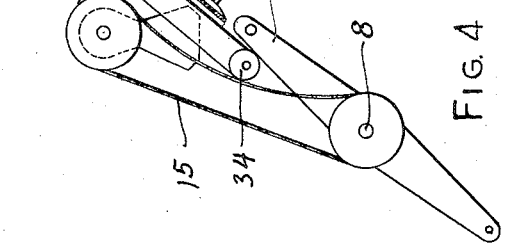

It is understood that various changes in the form, proportion, size, shape, weight and other details of construction, within the scope of our invention may be resorted to without departing from the spirit or broad principles of our invention and without sacrificing any of the advantages thereof; and it is also understood that the drawings are to be interpreted as being illustrative and not restrictive.

In the drawings:

Reference numeral 1 indicates the right hand end of a usual gin stand, looking from the front, and 2 indicates the left hand end. Reference numeral 3 indicates a connecting member between the two ends 1 and 2. Journaled between the two ends 1 and 2 is a shaft 4 to which is rigidly attached a usual cylinder 5 of gin saws 6 and the shaft 4 is adapted to be driven by a belt or other connection, not shown, which engages a pulley or sprocket 7 upon the right hand end of the shaft. Mounted upon a shaft 8 also journaled in the ends of the gin stand is a usual picker-roll 9 the periphery of which is provided with a multitude of outwardly extending spikes or pins 10. Also journaled between the ends 1 and 2 is an agitator cylinder 11 the exterior of which is provided when a plurality of blades 12 for agitating cotton and changing the position of each tuft as it comes in contact with the saws 6. The left hand end of the shaft upon which the agitator is mounted extends outwardly for a considerable distance past the left hand face of the end 2 of the gin stand and its outer end is equipped with a gear 13 by which it is driven to rotation by any usual driving connection, not shown. The belt wheel, or gear 13 is provided with a sprocket 14, and an endless chain 15 over the sprocket 14 acts as a means for driving the agitator through the medium of a second sprocket 16 carried by the shaft 11. The above described mechanism is usual to most types of gin stands and is not a part of this invention.

In usual gin stands the shaft 8 at each end is provided with threads and a nut which is sufficiently large in outside dimension to span a notch 17 provided in each end of the gin stand and the picker-roll shaft may be adjusted toward and away from the saw cylinder 5 by loosening and again tightening the nuts.

Our invention consists of a means for selectively moving the shaft 8 and the picker-roll 9, and consists substantially of the following described structure.

At a point substantially in vertical alinement with the shaft 8 and some little distance forward of the shaft 8 a rod 18 extends between the ends 1 and 2 and projects slightly past each. To the right hand end of the shaft 18 is rigidly connected an actuating arm 19 which extends upwardly and the upper end portion of which is provided with an in-turned edge 20 which is adapted to engage notches carried by an arcuate strap iron member 21 which is rigidly connected to the end 1 of the gin stand. The arm may therefore be disposed in various ones of the notches and will hold the shaft 18 at various desired radial positions. To the right hand end of the shaft 18 is also rigidly attached a crank arm 22 the outer end of which is pivotally connected by a pin 23 to a link 24. Pivotally connected by a pin 25 to the end 1 of the gin stand is an arm 26 into which the shaft 8 is journaled and the free end of the arm 26 is pivotally connected by a pin 27 to the free end of the link 24. It will readily be seen that movement of the arm 19 will raise and lower the free end of the arm 26 and consequently the shaft 8 and picker-roll 9 will be moved toward and away from the saw cylinder 5, and the member 21 will act to hold the picker-roll in its desired position of adjustment. The left hand end 2 of the gin stand is provided with a crank arm 28, link 29 and arm 30 which are similar in form and office to the members 22, 24 and 26 provided at the right hand end of the gin stand. Therefore, when the arm 19 is moved both ends of the shaft 8 and picker-roll 9 are moved likewise for the same distance.

It will be obvious that since the picker-roll is driven by the chain 15 connected to the agitator that movement of the shaft 8 toward and away from the agitator will cause the chain to be loosened and tightened according to the amount of movement made. It is therefore imperative that a means be provided for automatically maintaining the chain at a driving tautness at all times. For this purpose we have provided a pair of plates 31 and 32 which are pivotally connected to the end 2 by a pivot pin 33. The outermost plate 31 is provided with a rotatably mounted idler pulley 34 which is adapted to engage the chain 15 between the agitator 11 and the shaft 8. The uppermost end of the arm 30 is adapted to engage the lower face of the plate 32 and move it upwardly toward the sprocket 14 when the rod 18 is rotated in such a manner as to move the shaft 8 toward the agitator 11. The lowermost face of the plate 32 is provided with a lug 35 which extends outwardly over the lowermost face of the plate 31 and a set screw 36 is provided in the lug 35 so that its uppermost end engages the lowermost face of the plate 31. Therefore, when the plate 32 is moved upwardly the plate 31 is similarly moved and the idler pulley 34 is caused to engage the chain. The tension upon the chain may be regulated by adjustment of the set screw 36.

The arm 19 is so constructed that it may be sprung away from the end 1 sufficiently to permit its movement into various ones of the notches carried by the member 21.

From the foregoing description it may be seen that the device permits the instantaneous and desired adjustment of the picker-roll from and toward the saw cylinder 5; that both ends of the picker-roll are moved simultaneously an equal distance; that the chain 15 is automatically maintained at a driving tautness; and that the tension upon the chain may be adjusted by the set screw 36 if the idler pulley 34 or the chain becomes worn.

Obviously, the invention is susceptible of embodiment in forms other than that which is illustrated in the accompanying drawings and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In an adjusting mechanism for picker-rolls, the combination with a gin stand including saws, an agitator, a picker-roll and its shaft, an endless drive chain for driving the picker-roll, and a pair of hangers each pivoted to one end of the gin stand the free end of each rotatably supporting one end of the picker-roll shaft, of a rod extending through and journaled in the gin stand parallel to the picker-roll shaft, an arm carried by each end of the rod for engaging the hangers and swinging the picker-roll toward and away from the saws when the rod is rotated, a hand operated actuating arm for partially rotating the rod selectively to different positions of adjustment, and means carried by the gin stand for holding the actuating arm set in a desired position.

2. Organization as described in claim 1, in which the holding means includes a notched element rigidly attached to the gin stand and adapted to engage the actuating arm.

3. In an adjusting mechanism for picker-rolls, the combination with a gin stand including saws, an agitator, a picker-roll and its shaft, an endless drive chain for driving the picker-roll, and a pair of hangers each pivoted to one end of the gin stand the free end of each rotatably supporting one end of the picker-roll shaft, of a rod extending through and journaled in the gin stand parallel to the picker-roll shaft, an arm carried by each end of the rod for engaging the hangers and swinging the picker-roll toward and away from the saws when the rod is rotated, a hand operated actuating arm for partially rotating the rod selectively to different positions of adjustment, means carried by the gin stand for holding the actuating arm set in a desired position, and means for automatically tightening and loosening the drive chain when the picker-roll is moved toward and away from the saws.

4. Organization as described in claim 3, in which the last mentioned means includes an idler pulley pivotally mounted upon the gin stand and adapted to engage the chain between its carriers, a lever associated with the idler and also pivoted to the gin stand, a second similarly mounted lever contiguous with the first lever and having a projection extending therepast, a set screw in the projection for engaging the first lever, and operative connections between the rod and the second lever for operating the lever when the rod is rotated.

JOHN E. PRICE.
SAMUEL J. SHEHAN.